United States Patent
Ogawa et al.

(10) Patent No.: US 8,465,646 B2
(45) Date of Patent: Jun. 18, 2013

(54) METHOD AND APPARATUS FOR TREATING NITRATE WASTE LIQUID

(75) Inventors: Naoki Ogawa, Hyogo (JP); Katsushi Shibata, Hyogo (JP); Kazuhiko Kuroda, Tokyo (JP); Hiromitsu Nagayasu, Hyogo (JP); Kuniaki Takahashi, Ibaraki (JP); Yoshimi Kawato, Ibaraki (JP); Yoshihiro Meguro, Ibaraki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 347 days.

(21) Appl. No.: 12/811,151

(22) PCT Filed: Feb. 6, 2009

(86) PCT No.: PCT/JP2009/052095
§ 371 (c)(1),
(2), (4) Date: Jun. 29, 2010

(87) PCT Pub. No.: WO2009/099207
PCT Pub. Date: Aug. 13, 2009

(65) Prior Publication Data
US 2010/0282673 A1 Nov. 11, 2010

(30) Foreign Application Priority Data
Feb. 8, 2008 (JP) .................. 2008-029556

(51) Int. Cl.
*C02F 3/30* (2006.01)
*G21F 9/18* (2006.01)
*G21F 9/06* (2006.01)

(52) U.S. Cl.
USPC ........... 210/605; 210/610; 210/631; 210/259; 210/903

(58) Field of Classification Search
USPC ................ 210/605, 610, 623, 631, 252, 259, 210/903
See application file for complete search history.

(56) References Cited

U.S. PATENT DOCUMENTS 3,939,068 A * 2/1976 Wendt et al. .................. 210/605
5,290,451 A * 3/1994 Koster et al. .................. 210/605
(Continued)

FOREIGN PATENT DOCUMENTS
JP 7-013497 U 3/1995
JP 10-249392 A 9/1998
(Continued)

OTHER PUBLICATIONS

N. Ogawa et al, "Development of bio-treatment of high concentration sodium nitrate waste", 2006 Fall Meeting of the Atomic Energy Society of Japan at Hokkaido University, Sep. 27-29, 2006, p. A24, cited in ISR.
International Search Report of PCT/JP2009/052095, Mailing Date of Mar. 10, 2009.

*Primary Examiner* — Fred Prince
(74) *Attorney, Agent, or Firm* — Westerman, Hattori, Daniels & Adrian, LLP (57) ABSTRACT

To provide an apparatus for treating a nitrate waste liquid that includes a denitrification tank (12A) which accommodates active sludge that adsorbs or takes in the radioactive substance in a nitrate waste liquid (11) and in which an anaerobic microorganism that reduces the nitric acid to nitrogen gas grows, and a reaeration tank (14) in which a denitrification-treated liquid (24) treated in the denitrification tank (12A) is aerated and mixed with active sludge. A pH adjuster (21), a first carbon source (22A) and a second carbon source (22B) different in type from each other, and nitrogen gas ($N_2$) are supplied to the denitrification tank (12A) so as to separate a denitrified liquid into a solid content and the denitrification-treated liquid (24) by using a first solid-liquid separating film (25), and the denitrification-treated liquid (24) treated with the active sludge in the reaeration tank (14) is reaerated and separated into a solid content and a reaeration-treated liquid (27) by using a second solid-liquid separating film (28).

9 Claims, 7 Drawing Sheets

U.S. PATENT DOCUMENTS

| | | | |
|---|---|---|---|
| 6,328,891 B1 * | 12/2001 | Gaudre-Longerinas et al. | 210/605 |
| 2006/0213834 A1 | 9/2006 | Kando et al. | |
| 2010/0314311 A1 * | 12/2010 | Peng | 210/605 |

FOREIGN PATENT DOCUMENTS

| | | |
|---|---|---|
| JP | 2006-136853 A | 6/2006 |
| JP | 2007-105627 A | 4/2007 |
| JP | 2007-209964 A | 8/2007 |

* cited by examiner

METHOD AND APPARATUS FOR TREATING NITRATE WASTE LIQUID

TECHNICAL FIELD

The present invention relates to a method and an apparatus for treating a nitrate waste liquid capable of reducing nitric acid contained in waste water.

BACKGROUND ART

A nitrate waste liquid generated from nuclear facilities such as a reprocessing plant has high concentration (salt concentration of equal to or more than 1%) as well as being radioactive. Therefore, the nitrate waste liquid cannot be discharged as it is, and is finally cast into a cement-solidified form and disposed underground.

In recent years, there has been a concern that when the cement-solidified form contains nitrate, the nitrate may leak and pollute surrounding ground water and soil environment and thus dissolution of the nitrate is studied.

There are various methods for treating nitrate such as an electric reduction method, a chemical reduction method, and a biological reduction method. The electric reduction method has problems such as inhibition by heavy metals and generation of ammonia.

Besides, the chemical reduction method has problems such as exothermic reaction and generation of ammonia.

On the other hand, the biological reduction method allows treatment at an ordinary temperature and pressure and there is no generation of ammonia. Accordingly, the method of treating nitrate by using the biological treatment has been studied (Patent Document 1). However, in the method of Patent Document 1, only one type of carbon source is used, so the method has problems such that the amount of redundant sludge generated with the nitrate reduction treatment is increased and a secondary waste disposal expense is increased.

Figure 7:
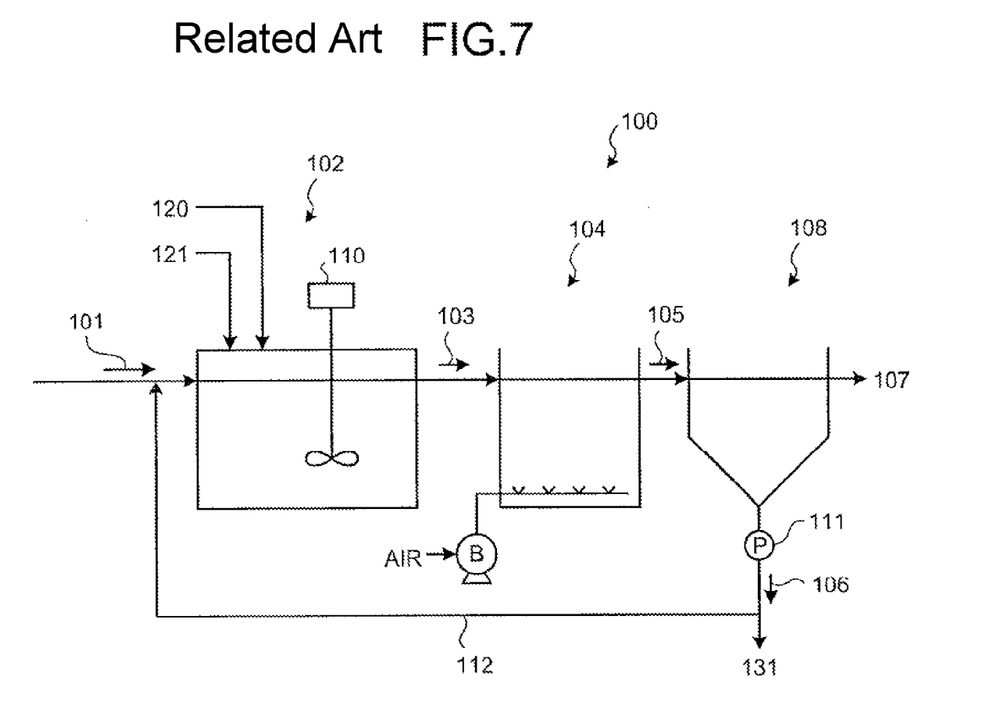
FIG. 7 is a schematic diagram of a configuration of a conventional apparatus for treating a nitrate waste liquid utilizing an organism.

FIG. 7 is a schematic diagram of a configuration of a conventional apparatus for treating a nitrate waste liquid utilizing an organism.

As shown in FIG. 7, a conventional apparatus 100 for treating a nitrate waste liquid includes a denitrification tank 102 that reduces nitric acid, which is present in a nitrate waste liquid 101 generated from nuclear facilities (not shown), to nitrogen gas, a reaeration tank 104 in which a denitrified liquid 103 obtained by denitrification is aerated and mixed with active sludge, and a precipitation tank 108 in which a reaerated liquid 105 discharged from the reaeration tank 104 is separated into precipitated sludge 106 and a treated liquid 107.

The denitrification tank 102 includes active sludge containing a large amount of denitrifying bacteria (not shown). In the denitrification tank 102, nitrate ions in a nitric-acid waste liquid are reduced to nitrogen gas ($N_2$) according to a reaction based on the following formula (1) by an action of an anaerobic microorganism (denitrifying bacteria) and is reduced from the nitric-acid waste liquid.

At this time, a carbon source 121 such as methanol and a pH adjuster 120 are supplied to the denitrification tank 102. Further, a mixer 110 is used to mix inside the denitrification tank 102.

$$NO_3^- + \tfrac{5}{6}CH_3OH \rightarrow \tfrac{1}{2}N_2 + \tfrac{5}{6}CO_2 + 7/6 H_2O + OH^- \qquad (1)$$

Thereafter, the reaerated liquid 105 passes through the precipitation tank 108 from the reaeration tank 104, and is sent as a treated liquid 107 to a subsequent process (not shown). The sludge 106 precipitated in the precipitation tank 108 is recovered as redundant sludge 131 by a circulating pump 111. Further, a part of the sludge 106 precipitated in the precipitation tank 108 is returned to the denitrification tank 102 via a returned-sludge supplying line 112 and is reused. The sludge not reused is removed from a system as the redundant sludge 131 and is sent to a disposing process (not shown).

Further, there is used a method and an apparatus for treating a nitrate-containing waste liquid. The method includes a microbial treatment process of reducing nitrate nitrogen and nitrite nitrogen to nitrogen by using anaerobic denitrifying bacteria in microorganism-containing sludge, and the apparatus includes a plurality of treatment tanks (Patent Document 2).

Patent Document 1: Japanese Patent No. 3697037
Patent Document 2: Japanese Patent Application Laid-open No. 2007-105627

DISCLOSURE OF INVENTION

Problem to be Solved by the Invention

However, in the conventional apparatus 100 for treating a nitrate waste liquid, when the concentration of nitrate in the nitrate waste liquid 101 is low (salt concentration is less than 1%), the denitrifying bacteria is not perished; however, when the concentration of nitrate in the nitrate waste liquid 101 is high (for example, about 1 to 7%), there is a problem that the denitrifying bacteria may be perished due to a rise in pH with the biological denitrification reaction.

Further, there is also the following problem. That is, when the concentration of nitrate in the nitrate waste liquid 101 is high (for example, about 1 to 7%), water seeps from a living organism due to a rise in an osmotic pressure, its biology cannot be maintained and the living organism is perished. Therefore, a minute sludge flock is generated and the sludge 106 does not precipitate in the precipitation tank 108, resulting in the sludge 106 flowing backwards with the treated liquid 107.

Still another problem is that, when the carbon source 121 supplied in the denitrification tank 102 (for example, organic acid such as acetic acid or sweetener) is changed, there occurs a multiplication of microorganisms, an increase in the generated amount of redundant sludge 131, and an increase in the amount of disposal.

There is also a problem for nuclear facilities that the increased generated amount of the redundant sludge 131 leads to huge expenses for disposal, because a secondary waste is disposed underground as a solidified form. That is, there is a problem that the amount of the secondary waste needs to be decreased.

Nuclear facilities that treat a nitrate waste liquid need to be installed within a controlled area for radiation, and thus there is a demand for making the treatment facilities compact.

Furthermore, as a microbial treatment system to be installed within a controlled area for radiation, there is a demand that it is needed to stabilize reactions and performances.

In view of the above problems, an object of the present invention is to provide a method and an apparatus for treating a nitrate waste liquid capable of efficiently microbially treating a waste liquid having a high nitrate concentration, and the apparatus can be installed within a controlled area for radiation.

Means for Solving Problem

According to an aspect of the present invention, a method for treating a nitrate waste liquid performing a treatment for reducing a nitrate waste liquid by using active sludge which adsorbs or takes in a radioactive substance in the nitrate waste liquid containing nitric acid and the radioactive substance and in which an anaerobic microorganism that reduces the nitric acid to nitrogen gas grows, includes: a first separation treatment step at which an active sludge treatment is performed by supplying a first carbon source in which the anaerobic microorganism can easily multiply and a second carbon source in which the anaerobic microorganism cannot easily multiply, while adjusting pH of the nitrate waste liquid in a denitrification tank that accommodates the nitrate waste liquid, and at a time of separating a denitrified liquid treated with the active sludge by providing a first solid-liquid separating unit that separates the denitrified liquid into a sludge-containing solid content and a denitrification-treated liquid, gas not containing oxygen is supplied thereby to accelerate a treatment for reducing anaerobic microorganism and cleanse active sludge adhered to the first solid-liquid separating unit with gas; and a second separation treatment step of further separating the denitrification-treated liquid treated at the first separation treatment step in a reaeration tank that accommodates the denitrification-treated liquid treated at the first separation treatment step and aerates and mixes the liquid with active sludge by providing a second solid-liquid separating unit that separates the liquid into a sludge-containing solid content and a reaeration-treated liquid.

Advantageously, in the method for treating a nitrate waste liquid, the first carbon source in which the anaerobic microorganism can easily multiply is one or both of organic acid and sweetener, and the second carbon source in which the anaerobic microorganism cannot easily multiply is alcohol.

Advantageously, in the method for treating a nitrate waste liquid, a supplying ratio of the first carbon source is from 40 to 90%.

According to another aspect of the present invention, an apparatus for treating a nitrate waste liquid includes: a denitrification tank that accommodates active sludge which adsorbs or takes in a radioactive substance in a nitrate waste liquid containing nitric acid and the radioactive substance and in which an anaerobic microorganism that reduces the nitric acid to nitrogen gas grows; and a reaeration tank that aerates and mixes a denitrification-treated liquid treated in the denitrification tank with active sludge in which the aerobic microorganism grows. The denitrification tank includes: a pH adjusting unit that supplies a pH adjuster used for adjusting pH of the nitrate waste liquid; first and second carbon-source supplying units that supply two types of carbon sources to the denitrification tank; a first solid-liquid separating unit that separates a denitrified liquid treated with the active sludge into a sludge-containing solid content and a denitrification-treated liquid; and a gas supplying unit that is arranged on a lower side of the first solid-liquid separating unit and supplies gas not containing oxygen into the denitrification tank. The reaeration tank includes: a second solid-liquid separating unit that further separates the denitrification-treated liquid treated with the active sludge into a sludge-containing solid content and a treated liquid; and an air supplying unit that is arranged on a lower side of the second solid-liquid separating unit and supplies air into the reaeration tank.

Advantageously, in the apparatus for treating a nitrate waste liquid, the first carbon source is a carbon source in which the anaerobic microorganism can easily multiply and the second carbon source is a carbon source in which the anaerobic microorganism cannot easily multiply.

Advantageously, in the apparatus for treating a nitrate waste liquid, the first carbon source in which the anaerobic microorganism can easily multiply is one or both of organic acid and sweetener, and the second carbon source in which the anaerobic microorganism cannot easily multiply is alcohol.

Advantageously, in the apparatus for treating a nitrate waste liquid, a supplying ratio of the first carbon source is from 40 to 90%.

Advantageously, in the apparatus for treating a nitrate waste liquid, pH of a treated liquid in the denitrification tank is from 7.0 to 10.0.

Advantageously, in the apparatus for treating a nitrate waste liquid, nitrogen gas and carbon dioxide produced by an active sludge treatment in the denitrification tank are circulated to the denitrification tank by using a gas circulating line.

Effect of the Invention

According to the present invention, by supplying two types of different carbon sources in a denitrification tank, the amount of active sludge to be multiplied can be decreased while maintaining a multiplication performance of an anaerobic microorganism.

Further, the present invention includes a first solid-liquid separating unit that separates a denitrified liquid treated with active sludge in a denitrification tank into a sludge-containing solid content and a denitrification-treated liquid, and a second solid-liquid separating unit that further separates a reaerated liquid treated in a reaeration tank into a sludge-containing solid content and a reaeration-treated liquid. Therefore, minute sludge can be prevented from flowing out with a treated liquid.

EXPLANATIONS OF LETTERS OR NUMERALS

10A to 10D apparatus for treating nitrate waste liquid
11 nitrate waste liquid
12A, 12B, 12C denitrification tank
14 reaeration tank
21 pH adjuster
22A first carbon source
22B second carbon source
23 denitrified liquid
24 denitrification-treated liquid 25 first solid-liquid separating film
26A, 26B solid content (redundant sludge)
27 reaeration-treated liquid
28 second solid-liquid separating film
29 reaerated liquid
30 gas supplying unit
31A gas discharge line
31B gas circulating line
32, 35 blower
33 pressure valve
34 air supplying unit
50 nitrate waste liquid (undiluted)
51 adjusting tank
52 electrical conductivity meter (EC meter)
53 industrial-water introducing line
54 industrial-water supply-amount adjusting valve
55 nitric-acid-waste-liquid supplying line
61 industrial water
62 diluter
63 biological treatment device
65 sludge
67 sludge dewatering device
68 dewatered sludge
69 incinerator
70 treated liquid
71 incinerated ashes
72 cleansing water
$P_1$ denitrification-treated-liquid supplying pump
$P_2$ reaeration-treated-liquid supplying pump
$P_3$ nitrate-waste-liquid supplying pump

BEST MODE(S) FOR CARRYING OUT THE INVENTION

Exemplary embodiments of the present invention will be explained below in detail with reference to the accompanying drawings. Note that the present invention is not limited to the embodiments. In addition, constituent elements in the embodiments include those that can be easily assumed by those skilled in the art or that are substantially equivalent.

First Embodiment

An apparatus for treating a nitrate waste liquid according to an embodiment of the present invention is explained with reference to the drawings.

Figure 1:
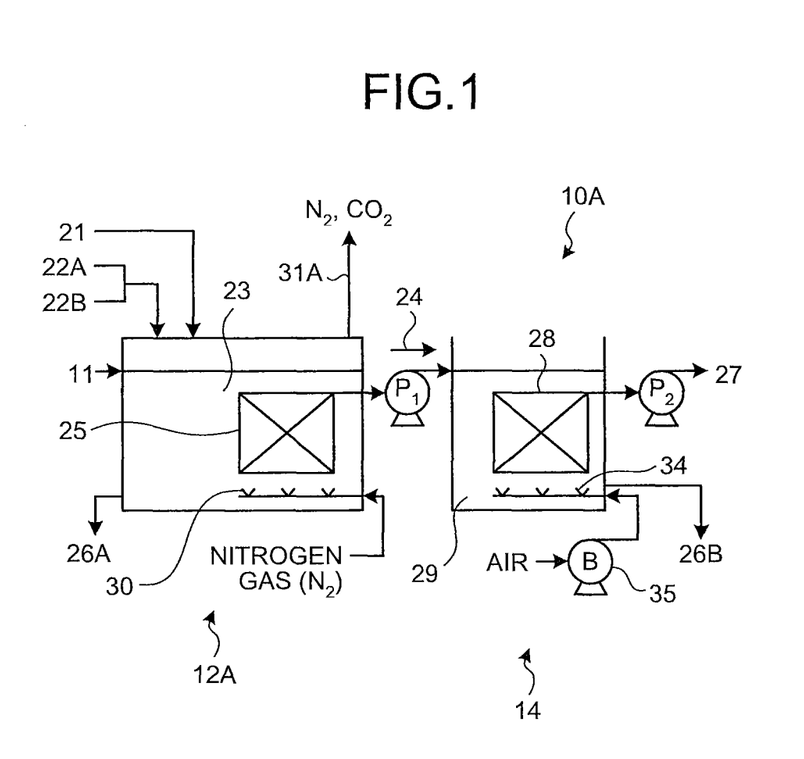
FIG. 1 is a conceptual diagram of an apparatus for treating a nitrate waste liquid according to a first embodiment of the present invention.

FIG. 1 is a conceptual diagram of an apparatus for treating a nitrate waste liquid according to a first embodiment of the present invention.

An apparatus 10A for treating a nitrate waste liquid according to the present embodiment is an apparatus for treating a nitrate waste liquid including a denitrification tank 12A which accommodates active sludge that adsorbs or takes in a radioactive substance in a nitrate waste liquid 11 containing nitric acid and the radioactive substance and in which an anaerobic microorganism that reduces the nitric acid to nitrogen gas grows, and a reaeration tank 14 in which a denitrification-treated liquid 24 treated in the denitrification tank 12A is aerated and mixed with the active sludge. The denitrification tank 12A further includes a pH adjusting unit (not shown) that supplies a pH adjuster 21 used for adjusting pH of the nitrate waste liquid 11, a carbon-source supplying unit (not shown) that supplies a first carbon source 22A and a second carbon source 22B different in type each other to the denitrification tank 12A, a first solid-liquid separating film 25 that is a first solid-liquid separating unit that separates a denitrified liquid 23 treated with the active sludge into a solid content containing sludge (redundant sludge 26A) and a treated liquid, and a gas supplying unit 30 that is arranged on a lower side of the first solid-liquid separating film 25 and supplies gas not containing oxygen (for example, one or both of nitrogen gas ($N_2$) and carbon dioxide gas ($CO_2$) into the denitrification tank 12A. The reaeration tank 14 includes a second solid-liquid separating film 28 or a second solid-liquid separating unit that reaerates the denitrification-treated liquid 24 treated with the active sludge to further separate a reaerated liquid 29 into the redundant sludge 26B and a reaeration-treated liquid 27, and an air supplying unit 34 that is arranged on a lower side of the second solid-liquid separating film 28 and uses a blower 35 to supply air into the reaeration tank 14.

At a lower portion of the first solid-liquid separating film 25 and the second solid-liquid separating film 28, the gas supplying unit 30 and the air supplying unit 34 are arranged, respectively. When the supplied gas rises, a liquid mixed with the active sludge passes through surfaces of the separating films, and at this time, the liquid only permeates the films, and a solid-liquid separation is performed in this way. The active sludge that is left after the separation adheres to the film surface; however, the film surface is always cleansed with a flow of the supplied gas. As a result, the active sludge that adheres to the film surface is cleansed and reduced. This makes it possible to perform a solid-liquid separation by using the film surface that is always clean. In FIG. 1, reference character $P_1$ denotes a denitrification-treated-liquid supplying pump that supplies the denitrification-treated liquid 24 to the reaeration tank 14 and reference character $P_2$ denotes a reaeration-treated-liquid supplying pump that sends the reaeration-treated liquid 27.

The first carbon source 22A is a carbon source in which the anaerobic microorganism can multiply easily, and the second carbon source 22B is a carbon source in which the anaerobic microorganism cannot multiply easily.

Mixing and inserting carbon sources with different types of properties enables a decrease of the generated amount of sludge while maintaining a denitrification performance.

As the carbon source of the first carbon source 22A in which the microorganism can multiply easily can include one or both of organic acid and sweetener, and the carbon source of the second carbon source 22B in which the microorganism cannot multiply easily can include alcohols such as methanol.

Further, to decrease the generated amount of sludge while maintaining the denitrification performance more effectively, it is preferable that a supply ratio of the first carbon source 22A is 40 to 90%, more preferably 45 to 90%, and further preferably 50 to 90%.

Figure 6:
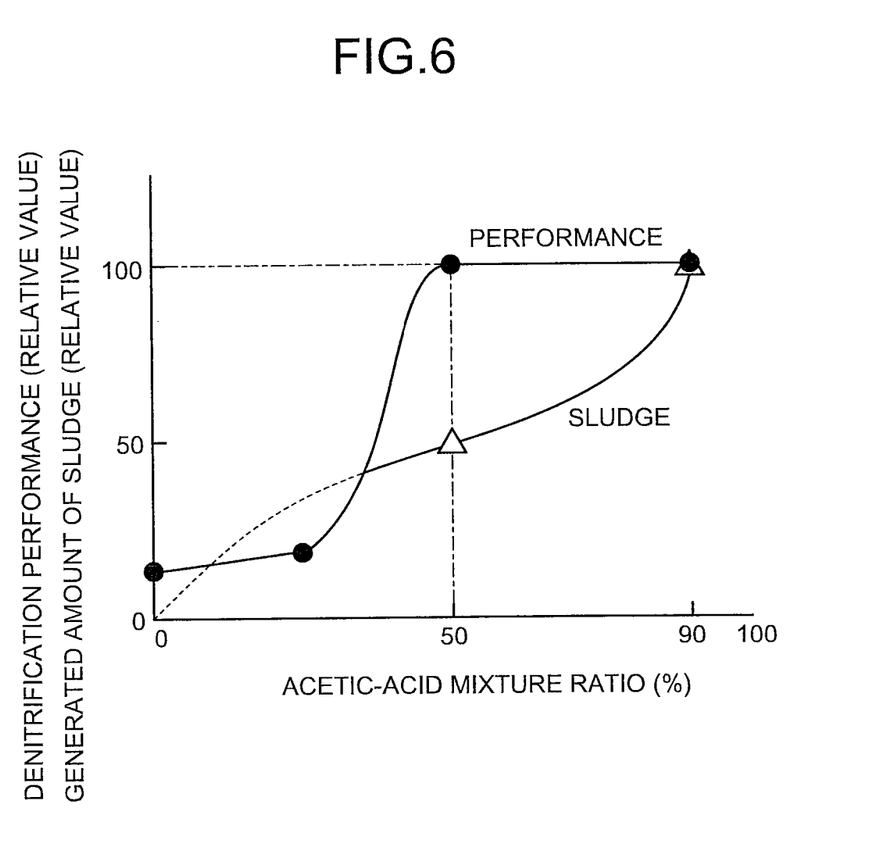
FIG. 6 depicts a relationship of an acetic-acid mixture ratio, a denitrification performance, and a generated amount of sludge.

FIG. 6 is a graph of a relationship of an acetic-acid mixture ratio when acetic acid is used as the first carbon source 22A, and the denitrification performance and the generated amount of sludge. As shown in FIG. 6, when acetic acid was used as the first carbon source 22A and methanol as the second carbon source 22B, it was confirmed that the acetic-acid mixture ratio was about 40%, the denitrification performance was about 70%, and the generated amount of sludge was about 45%.

Further, it was confirmed that when the acetic-acid mixture ratio was about 50%, the denitrification performance was about 100% and thus favorable, and the generated amount of sludge was about 50%.

In the apparatus 10A for treating a nitrate waste liquid according to the present embodiment, the first solid-liquid separating film 25 and the second solid-liquid separating film 28 are respectively arranged in the denitrification tank 12A and the reaeration tank 14. Accordingly, the minute sludge can be completely separated into the denitrified liquid 23 or the reaerated liquid 29. This can prevent the sludge from flowing out. Although not limited thereto, examples of types of the first solid-liquid separating film 25 and the second solid-liquid separating film 28 include well-known solid-liquid separating films such as a flat film and a hollow fiber film.

As a result, when the minute sludge is completely separated from the denitrification-treated liquid 24 or the reaeration-treated liquid 27, it is possible to decrease the concentration of suspended solid (SS) such as dust and metal hydroxide of the discharged reaeration-treated liquid 27.

When the first solid-liquid separating film 25 is installed within the denitrification tank 12A, it is possible to prevent denitrifying bacteria from flowing out, and there is no contamination of any other bacteria. Thus, only a large amount of denitrifying bacteria multiplied within the denitrification tank 12A exist in the tank. As a result, a sufficient amount of sludge can be secured, and the sludge concentration within the denitrification tank 12A can be maintained at a high level. Accordingly, a high-level denitrification performance of the denitrification tank 12A can be maintained and the apparatus can be made compact.

When the first solid-liquid separating film 25 and the second solid-liquid separating film 28 are arranged, a particulate radioactive substance contained in the nitrate waste liquid 11 can be also separated from the reaeration liquid 29. Thus, it is possible to decrease the radioactive concentration of the reaeration-treated liquid 27 discharged to outside.

In the apparatus 10A for treating a nitrate waste liquid according to the present embodiment, the pH of the denitrified liquid 23 in the denitrification tank 12A is preferably adjusted from 7.0 to 10.0. It is preferable that the pH is from 8.0 to 9.5, and more preferably the pH is 8.0 to 9.0. This is because when the pH of the denitrified liquid 23 exceeds 10.0, the microorganism is perished. Moreover, when the pH is less than 7.0, a reaction rate for a treatment for reducing the nitrogen gas in the microorganism is decreased.

In the apparatus 10A for treating a nitrate waste liquid according to the present embodiment, to improve an execution of the treatment for reducing the nitrogen gas by the anaerobic microorganism, the gas supplying unit 30 is arranged on a lower side (bottom surface side of the tank) of the first solid-liquid separating film 25 of the denitrification tank 12A so as to supply gas not containing oxygen (for example, nitrogen gas) to the denitrified liquid 23 of the denitrification tank 12A.

By supplying nitrogen gas into the denitrified liquid 23 in the denitrification tank 12A via the gas supplying unit 30, the denitrified liquid 23 in the denitrification tank 12A can be forcedly stirred and the treatment for reducing the nitrogen gas by the microorganisms can be accelerated. Moreover, when nitrogen gas is supplied via the gas supplying unit 30 from below the first solid-liquid separating film 25, the active sludge that adheres to the first solid-liquid separating film 25 can be reduced. As a result, due to a gas cleansing effect, clogging of the film can be prevented.

In the apparatus 10A for treating a nitrate waste liquid according to the present embodiment, nitrogen gas ($N_2$ gas) is supplied by the gas supplying unit. However, the present invention is not limited thereto, and any gas that does not contain oxygen, such as carbon dioxide gas ($CO_2$ gas) and an inactive gas, can be used.

Further, in the apparatus 10A for treating a nitrate waste liquid according to the present embodiment, nitrogen gas ($N_2$) and carbon dioxide gas ($CO_2$) generated in the denitrification tank 12A are released to outside via a gas discharge line 31A.

In the apparatus 10A for treating a nitrate waste liquid according to the present embodiment, initially, the sludge used in sewage sludge or an industrial waste treatment is put in as seed sludge and active sludge multiplied until the active sludge concentration reaches, for example, about 5,000 to 20,000 mg/L, can be used. The active sludge can be held by a granular carrier or a fibrous carrier. However, in the present invention, floating active sludge is preferably used.

In the apparatus 10A for treating a nitrate waste liquid according to the present embodiment, although the present invention is not limited thereto, examples of the first carbon source 22A include, apart from using the acetic acid, one or both of organic acid such as formic acid and propionic acid and sweetener such as glucose, fructose, maltose, sucrose, and galactose can be used.

In the apparatus 10A for treating a nitrate waste liquid according to the present embodiment, although the present invention is not limited thereto, examples of the pH adjuster 21 include sulfuric acid and hydrochloric acid.

In the apparatus 10A for treating a nitrate waste liquid according to the present embodiment, as the microorganism contained in the active sludge in the denitrification tank 12A, a well-known anaerobic microorganism that exhibits a denitrification performance can be used. Although not particularly limited thereto, in the reaeration tank 14, a well-known aerobic microorganism for a reaeration can be used.

In the apparatus 10A for treating a nitrate waste liquid according to the present embodiment, the first solid-liquid separating film 25 and the second solid-liquid separating film 28 are used as the solid-liquid separating unit; however, the present invention is not limited thereto, and any unit that can separate the sludge and the liquid can be used.

As described above, in the apparatus 10A for treating a nitrate waste liquid according to the present embodiment, the first solid-liquid separating film 25 and the second solid-liquid separating film 28 are respectively arranged in the denitrification tank 12A and the reaeration tank 14. Accordingly, the minute sludge can be completely separated into the denitrification-treated liquid 24 and the reaeration-treated liquid 27. Thus, the radioactive substance and the sludge can be prevented from flowing out. Moreover, the concentration of suspended solid (SS), such as dust and metal hydroxide, in the reaeration-treated liquid 27 that is discharged from the reaeration tank 14 and is separately treated can be improved.

Because a sufficient amount of sludge can be secured within the denitrification tank 12A, the sludge concentration within the denitrification tank 12A can be maintained at a high level. Therefore, a high-level denitrification performance of the denitrification tank 12A can be maintained and the apparatus can be made compact.

Test Example

By using the apparatus according to the present embodiment, a denitrification test was conducted on a nitrate waste liquid having an undiluted nitric-acid nitrogen concentration of 6700 to 9200 mg/L (salt concentration: 4.0 to 5.5%) by using methanol and acetic acid as a carbon source with a test temperature set to 20 to 25° C. (room temperature).

When an acetic acid dosage was made 50%, the denitrification performance of 7 kg-N/m³/d, attained when the first solid-liquid separating film was arranged in the denitrification tank, was maintained. At the same time, the generated amount of redundant sludge was decreased to equal or less than ½.

Second Embodiment

An apparatus for treating a nitrate waste liquid according to a second embodiment of the present invention is explained with reference to FIG. 2.

Figure 2:
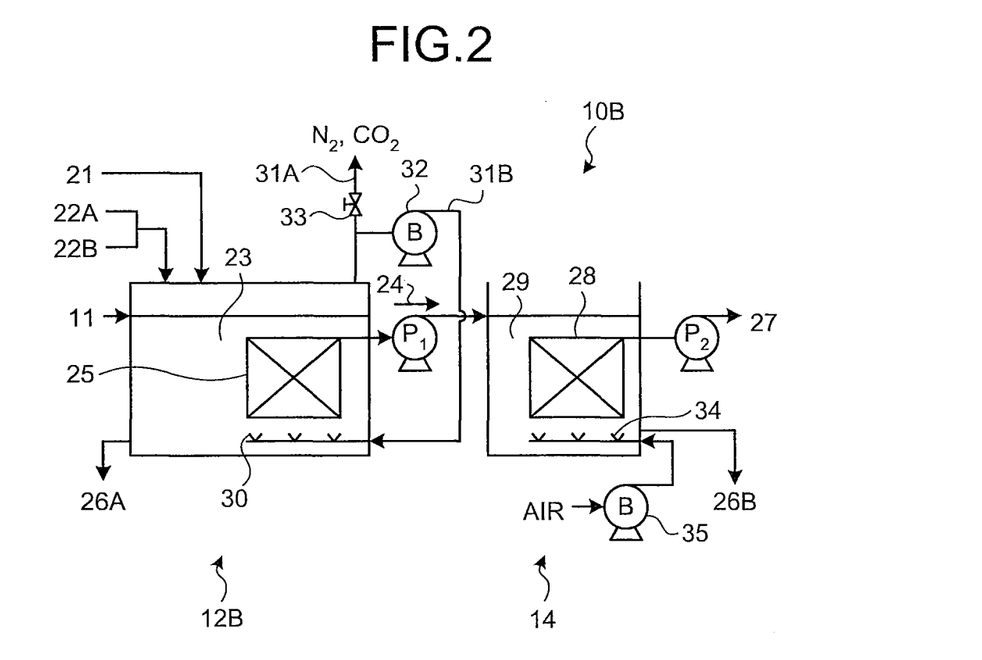
FIG. 2 is a schematic diagram of a configuration of an apparatus for treating a nitrate waste liquid according to a second embodiment of the present invention.

As shown in FIG. 2, in an apparatus 10B for treating a nitrate waste liquid according to the present embodiment, nitrogen gas ($N_2$) and carbon dioxide gas ($CO_2$ gas) produced by a reaction between the anaerobic microorganism in a denitrification tank 12B and the nitric acid present in the denitrified liquid 23 are circulated into the denitrification tank 12B.

Specifically, nitrogen gas ($N_2$) and carbon dioxide gas ($CO_2$) generated in the denitrification tank 12B are fed to the gas supplying unit 30 by using a blower 32 interposed through a gas circulating line 31B, and then introduced into the denitrification tank 12B.

In this way, the nitrogen gas ($N_2$) and the carbon dioxide gas ($CO_2$) generated as a result of the microorganism reaction within the denitrification tank 12B are re-circulated and re-used within the denitrification tank 12B. Therefore, there is no need to separately arrange the nitrogen gas supplying unit (as shown in FIG. 1) that supplies gas not containing oxygen. As a result, it is possible to eliminate the nitrogen gas supplying unit and to reduce gas purchasing costs.

Further, in the apparatus 10B for treating a nitrate waste liquid according to the present embodiment, there is arranged a pressure valve 33 that discharges a gas to outside from a portion of the gas discharge line 31A that discharges nitrogen gas ($N_2$) and carbon dioxide gas ($CO_2$) generated in the denitrification tank 12B. Thereby, redundant nitrogen gas ($N_2$) and carbon dioxide gas ($CO_2$) can be released by opening the pressure valve 33.

Thus, according to the present embodiment, because the nitrogen gas ($N_2$) and the carbon dioxide gas ($CO_2$) generated in the denitrification tank 12B are used, the gas consumes itself efficiently. As a result, the gas supply apparatus and gas purchasing costs can be reduced.

Third Embodiment

An apparatus for treating a nitrate waste liquid according to a third embodiment of the present invention is explained with reference to FIG. 3.

Figure 3:
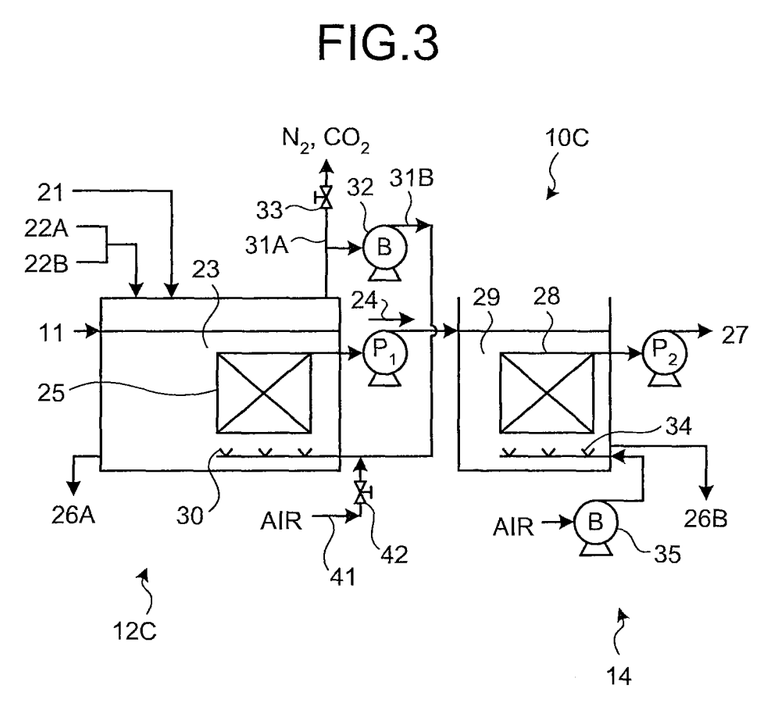
FIG. 3 is a schematic diagram of a configuration of an apparatus for treating a nitrate waste liquid according to a third embodiment of the present invention.

As shown in FIG. 3, in an apparatus 10C for treating a nitrate waste liquid according to the present embodiment, instead of nitrogen gas ($N_2$), air is supplied to a denitrification tank 12C. Furthermore, the apparatus 10C includes a gas circulating line that circulates the nitrogen gas and the carbon dioxide gas produced in the denitrification tank 12C into the denitrification tank 12C.

That is, the apparatus 10C for treating a nitrate waste liquid according to the present embodiment includes an air-supplying line 41 that supplies air instead of nitrogen gas to the denitrification tank of the apparatus 10A for treating a nitrate waste liquid according to the first embodiment shown in FIG. 1, and the gas circulating line 31B that circulates the nitrogen gas ($N_2$) and the carbon dioxide gas ($CO_2$) produced in the denitrification tank of the apparatus 10B for treating a nitrate waste liquid according to the second embodiment shown in FIG. 2, into the denitrification tank 12C.

Further, in the apparatus 10C for treating a nitrate waste liquid according to the present embodiment, an air-supply-amount adjusting valve 42 is arranged in the air-supplying line 41, and the air-supply-amount adjusting valve 42 is repeatedly opened and closed at regular intervals. The valve 42 can be opened and closed, for example, for about two to five minutes a week, to supply air intermittently to the denitrification tank 12C.

As a result, when organic acid (for example, formic acid, acetic acid, and propionic acid) or sweetener (for example, glucose, fructose, maltose, sucrose, and galactose) are used as the carbon source, when an oxidation reduction potential (ORP) decreases, the reaction progresses with the organic substance only and the nitric acid is not used. Therefore, there is a case that the nitric acid does not decrease; however, by supplying a slight amount of oxygen as mentioned above, the decrease in the denitrification performance can be prevented.

It is possible to increase the types of carbon sources that can be used to treat the high-concentration nitrate waste liquid 11.

A reductive atmosphere in the denitrification tank 12C is mitigated, and thus generation of hydrogen sulfide ($H_2S$) can be prevented and it is possible to suppress the corrosion of piping of a reaction container, for example.

Fourth Embodiment

An apparatus for treating a nitrate waste liquid according to a fourth embodiment of the present invention is explained with reference to FIG. 4.

Figure 4:
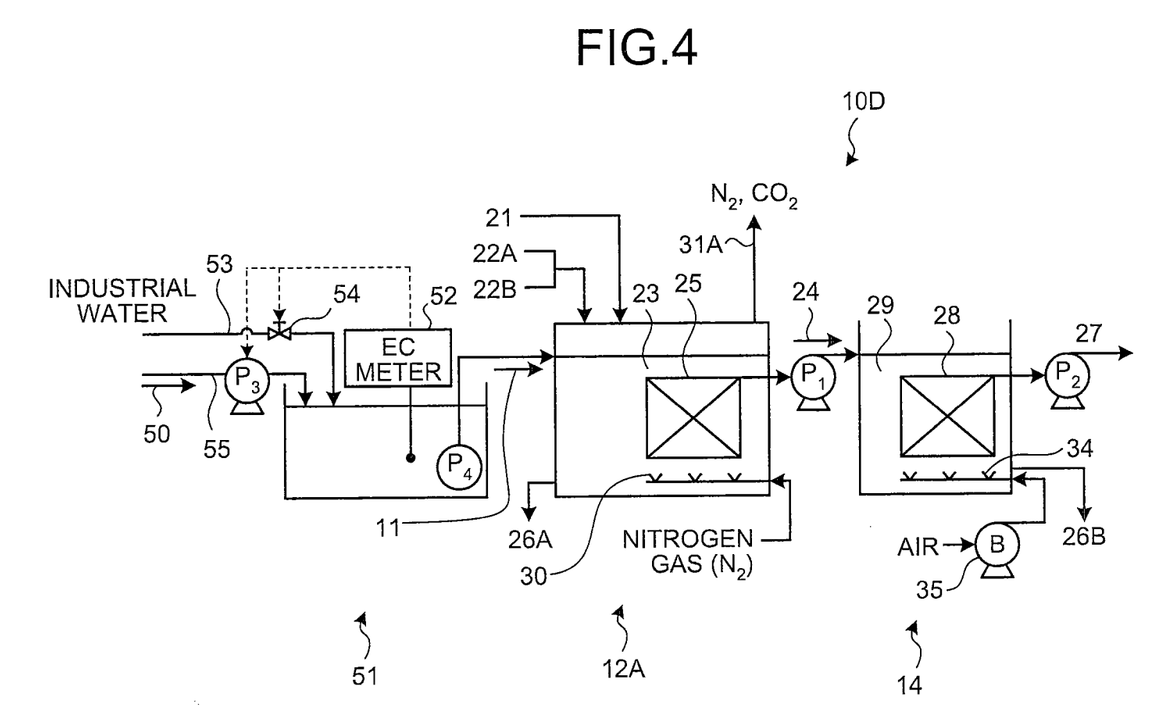
FIG. 4 is a schematic diagram of a configuration of an apparatus for treating a nitrate waste liquid according to a fourth embodiment of the present invention.

As shown in FIG. 4, in an apparatus 10D for treating a nitrate waste liquid according to the present embodiment, an adjusting tank 51 that supplies a nitrate waste liquid (undiluted: salt concentration of 30 to 40%) 50 is arranged at an upstream of the denitrification tank 12A of the apparatus 10A for treating a nitrate waste liquid according to the first embodiment shown in FIG. 1. The adjusting tank 51 includes an electrical conductivity meter (EC meter) 52 that measures a level of electric conductivity, an industrial-water introducing line 53, and an industrial-water supply-amount adjusting valve 54 which is arranged in the industrial-water introducing line 53 and which adjusts a flow rate of water to be diluted based on a measurement value of the electrical conductivity meter (EC meter) 52.

The industrial-water supply-amount adjusting valve 54 arranged in the industrial-water introducing line 53 is controlled based on the EC value measured by the electrical conductivity meter (EC meter) 52 arranged in the adjusting tank 51 to adjust the flow rate of water supplied to the adjusting tank 51.

Specifically, when the EC value measured by the electrical conductivity meter (EC meter) 52 is high, the industrial-water supply-amount adjusting valve 54 is opened, and when the EC value measured by the electrical conductivity meter (EC meter) 52 is low, the industrial-water supply-amount adjusting valve 54 is closed.

In the apparatus 10D for treating a nitrate waste liquid according to the present embodiment, when a biological treatment is performed in a high salt concentration state of about 4%, for example, by diluting the nitrate waste liquid (undiluted: salt concentration of 30 to 40%) 50, a control range of an EC value measured by the electrical conductivity meter (EC meter) 52 at this time is preferably from 50 to 70 mS/cm, and more preferably from 53 to 68 mS/cm.

In the apparatus 10D for treating a nitrate waste liquid according to the present embodiment, a nitrate-waste-liquid supplying pump $P_3$ is arranged in a nitric-acid-waste-liquid supplying line 55 that feeds the undiluted nitrate waste liquid 50 to the adjusting tank 51. Based on the EC value measured by the electrical conductivity meter (EC meter) 52, the nitrate-waste-liquid supplying pump $P_3$ is controlled, and a supply amount of the undiluted nitrate waste liquid 50 to be fed to the adjusting tank 51 is thus adjusted.

Specifically, when the EC value measured by the electrical conductivity meter (EC meter) 52 is high, the nitrate-waste-liquid supplying pump $P_3$ is stopped to halt supplying of the undiluted nitrate waste liquid 50 to the adjusting tank 51, and when the EC value measured by the electrical conductivity meter (EC meter) 52 is low, the nitrate-waste-liquid supplying pump $P_3$ is operated and the nitrate waste liquid 50 is supplied to the adjusting tank 51.

Therefore, even when the concentration of a highly concentrated nitrate waste liquid from the treatment facilities is not constant, by adjusting the concentration of the undiluted nitrate waste liquid 50 in the adjusting tank 51, the nitrate waste liquid (diluted solution) 11 with a constant salt concentration can be supplied to the denitrification tank 12A by operating the supplying pump $P_4$ and the denitrification performance can be stabilized.

Fifth Embodiment

A biological treatment system 60 using an apparatus for treating a nitrate waste liquid according to a fifth embodiment of the present invention is explained with reference to FIG. 5.

As the apparatus for treating a nitrate waste liquid according to the present embodiment, any one of the apparatuses for treating a nitrate waste liquid according to the first to fourth embodiments shown in FIGS. 1 to 4 can be used, and thus explanations thereof will be omitted.

Figure 5:
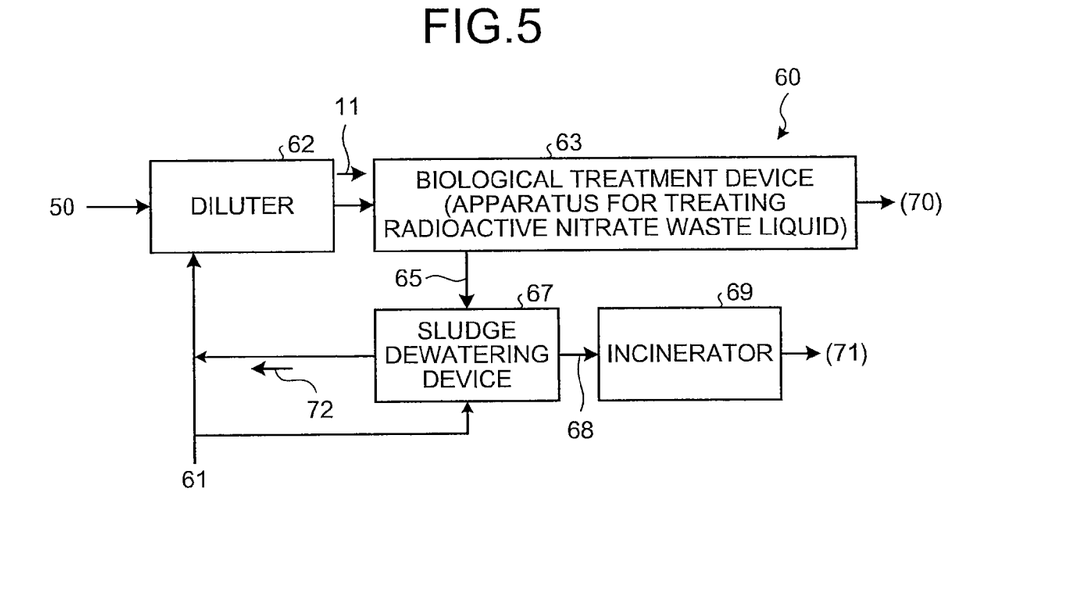
FIG. 5 is a schematic diagram of a configuration of a biological treatment system using an apparatus for treating a nitrate waste liquid according to a fifth embodiment of the present invention.

As shown in FIG. 5, the biological treatment system 60 according to the present embodiment includes a diluter 62 that dilutes the nitrate waste liquid (undiluted liquid) 50 with industrial water 61, a biological treatment device (any one of the apparatuses for treating a nitrate waste liquid according to the first to fourth embodiments) 63 in which nitric acid ions in the diluted nitrate waste liquid 11 are microbially treated for reduction with nitrogen and reaeration, a sludge dewatering device 67 that separates sludge 65 and a treated liquid 70 from the biologically treated liquid treated in the biological treatment device 63 and dewaters the separated sludge 65, and an incinerator 69 that incinerates dewatered sludge 68.

The diluter 62 operates in the adjusting tank 51 that dilutes an undiluted liquid as shown in FIG. 4 corresponding to the fourth embodiment described above. The biological treatment device 63 is an apparatus for treating a nitrate waste liquid including one of the denitrification tanks 12A, 12B, and 12C, and the reaeration tank 14.

The sludge dewatering device 67 dewaters the redundant sludge discharged from the denitrification tank and the reaeration tank of the biological treatment device 63. The incinerator 69 incinerates the dewatered sludge 68 or secondary waste discharged from the sludge dewatering device 67 into incinerated ashes 71.

In the biological treatment device 63 that biologically treats the nitric-acid waste liquid having a high salt concentration, at the time of dewatering the redundant sludge, the salt concentration in the water that adheres to the sludge is high, and thus an amount of secondary waste (incinerated ashes) occasionally increases. For this, in the sludge dewatering device 67, the industrial water 61 is added to flush the adhered liquid having a high salt concentration, and flushed cleansing water 72 is used as diluting water in the diluter 62 that dilutes the nitrate waste liquid 11.

Therefore, a part of the industrial water 61 used in the diluter 62 is used for cleansing at the time of dewatering, and thus there is no need to use additional industrial water 61.

Further, by decreasing the salt concentration in the adhering water, the amount of the secondary waste (incinerated ashes) can be decreased to about ½.

INDUSTRIAL APPLICABILITY

As described above, by using the apparatus for treating a nitrate waste liquid according to the present invention, a waste liquid with a high nitrate concentration discharged from nuclear facilities such as a reprocessing plant can be microbially treated efficiently, and minute sludge can be prevented from flowing out with a treated liquid.

The invention claimed is:

1. A method for treating a nitrate waste liquid performing a treatment for reducing a nitrate waste liquid by using active sludge which adsorbs or takes in a radioactive substance in the nitrate waste liquid containing nitric acid and the radioactive substance and in which an anaerobic microorganism that reduces the nitric acid to nitrogen gas grows, the method comprising:
  a first separation treatment step at which an active sludge treatment is performed by supplying a first carbon source in which the anaerobic microorganism can easily multiply and a second carbon source in which the anaerobic microorganism cannot easily multiply, while adjusting pH of the nitrate waste liquid in a denitrification tank that accommodates the nitrate waste liquid, and at a time of separating a denitrified liquid treated with the active sludge by providing a first solid-liquid separating unit that separates the denitrified liquid into a sludge-containing solid content and a denitrification-treated liquid, gas not containing oxygen is supplied thereby to accelerate a treatment for reducing anaerobic microorganism and cleanse active sludge adhered to the first solid-liquid separating unit with gas; and
  a second separation treatment step of further separating the denitrification-treated liquid treated at the first separation treatment step in a reaeration tank that accommodates the denitrification-treated liquid treated at the first separation treatment step and aerates and mixes the liquid with active sludge by providing a second solid-liquid separating unit that separates the liquid into a sludge-containing solid content and a reaeration-treated liquid.

2. The method for treating a nitrate waste liquid according to claim 1, wherein the first carbon source in which the anaerobic microorganism can easily multiply is one or both of organic acid and sweetener, and the second carbon source in which the anaerobic microorganism cannot easily multiply is alcohol.

3. The method for treating a nitrate waste liquid according to claim 1, wherein a supplying ratio of the first carbon source is from 40 to 90% by weight.

4. An apparatus for treating a nitrate waste liquid, comprising:
  a denitrification tank that accommodates active sludge which adsorbs or takes in a radioactive substance in a nitrate waste liquid containing nitric acid and the radioactive substance and in which an anaerobic microorganism that reduces the nitric acid to nitrogen gas grows; and
  a reaeration tank that aerates and mixes a denitrification-treated liquid treated in the denitrification tank with active sludge in which the aerobic microorganism grows, wherein
  the denitrification tank comprises:
  a pH adjusting unit that supplies a pH adjuster used for adjusting pH of the nitrate waste liquid;

first and second carbon-source supplying units that supply two types of carbon sources to the denitrification tank;

a first solid-liquid separating unit that separates a denitrified liquid treated with the active sludge into a sludge-containing solid content and a denitrification-treated liquid; and a gas supplying unit that is arranged on a lower side of the first solid-liquid separating unit and supplies gas not containing oxygen into the denitrification tank, and the reaeration tank comprises:

a second solid-liquid separating unit that further separates the denitrification-treated liquid treated with the active sludge into a sludge-containing solid content and a treated liquid; and an air supplying unit that is arranged on a lower side of the second solid-liquid separating unit and supplies air into the reaeration tank.

5. The apparatus for treating a nitrate waste liquid according to claim 4, wherein the first carbon source is a carbon source in which the anaerobic microorganism can easily multiply and the second carbon source is a carbon source in which the anaerobic microorganism cannot easily multiply.

6. The apparatus for treating a nitrate waste liquid according to claim 5, wherein the first carbon source in which the anaerobic microorganism can easily multiply is one or both of organic acid and sweetener, and the second carbon source in which the anaerobic microorganism cannot easily multiply is alcohol.

7. The apparatus for treating a nitrate waste liquid according to claim 4, wherein a supplying ratio of the first carbon source is from 40 to 90% by weight.

8. The apparatus for treating a nitrate waste liquid according to claim 4, wherein pH of a treated liquid in the denitrification tank is from 7.0 to 10.0.

9. The apparatus for treating a nitrate waste liquid according to claim 4, wherein nitrogen gas and carbon dioxide produced by an active sludge treatment in the denitrification tank are circulated to the denitrification tank by using a gas circulating line.

* * * * *